March 10, 1970     P. D. HURWITZ     3,499,180
SCRUBBING APPARATUS FOR VEHICLES
Filed June 12, 1968     4 Sheets-Sheet 2

INVENTOR
PAUL D. HURWITZ

BY Seidel & Gonda
ATTORNEYS

March 10, 1970     P. D. HURWITZ     3,499,180

SCRUBBING APPARATUS FOR VEHICLES

Filed June 12, 1968     4 Sheets-Sheet 3

INVENTOR
PAUL D. HURWITZ

BY Seidel & Gonda
ATTORNEYS

March 10, 1970 P. D. HURWITZ 3,499,180
SCRUBBING APPARATUS FOR VEHICLES
Filed June 12, 1968 4 Sheets-Sheet 4

INVENTOR
PAUL D. HURWITZ
BY
Seidel & Gonda
ATTORNEYS

United States Patent Office 3,499,180
Patented Mar. 10, 1970

3,499,180
SCRUBBING APPARATUS FOR VEHICLES
Paul D. Hurwitz, Wyncote, Pa., assignor to Sherman Car Wash Equipment Co., Palmyra, N.J., a corporation of New Jersey
Filed June 12, 1968, Ser. No. 736,359
Int. Cl. B60s 3/00
U.S. Cl. 15—97
10 Claims

ABSTRACT OF THE DISCLOSURE

A scrubbing apparatus for vehicles comprising a pair of curtain-like scrubbing elements disposed across the path of the vehicle, and a linkage means for moving the scrubbing elements so that points on their respective outer edges describe approximately circular paths of motion, and points at their respective inner edges oscillate in arcuate paths of motion.

---

This invention relates to scrubbing apparatus for vehicles. More particularly, this invention relates to scrubbing apparatus for vehicles suitable for use in conjunction with known automatic car wash equipment.

The present invention provides a scrubbing apparatus for use in connection with automatic car wash equipment. Thus, the present apparatus is adapted to scrub a vehicle as the vehicle advances therethrough. Scrubbing apparatus wherein sheet-like scrubbing members depend from and are moved back and forth by a carrier are known. Thus, in Patent 3,345,666, a sheet-like scrubbing member having slit lower ends was disclosed. The present apparatus is one wherein scrubbing members are provided with a unique motion wherein their respective outer edges describe a generally circular path, medial portions thereof describe a generally elliptical path, and the respective inner edges have an arcuate path of movement. The above-described motion results in a vertical scrubbing action against vertically disposed surfaces of the vehicles to be treated. Also, the motion provides horizontal scrubbing action against the horizontal surfaces of such vehicles. The net result is more thorough scrubbing than would be possible with scrubbers wherein all parts of the scrubbing members describe like paths of motion.

In an alternative form, the present invention can also provide for motion of the scrubbing members in a direction parallel to the path of motion of the vehicle.

In view of the foregoing, it is an object of this invention to provide a novel scrubbing apparatus for vehicles.

It is another object of this invention to provide a scrubbing apparatus for vehicles wherein parts of curtain-like scrubbing members describe generally circular paths, other parts of such scrubbing members describe generally elliptical paths, and still other parts describe arcuate paths.

It is still another object of this invention to provide a scrubbing apparatus for vehicles wherein curtain-like scrubbing members provide a component of motion parallel to a path of motion of a subject vehicle.

Other objects will appear hereinafter.

The foregoing and other objects are accomplished, in a preferred embodiment, by a scrubbing apparatus comprising a frame having an opening therein adapted to receive a vehicle, and curtain-like scrubbing members suspended from the frame and partially closing the opening. The scrubbing members are coupled to the frame by means providing movement transversely and vertically with respect to the frame. In the preferred form, such elements comprise a crank arm coupled to an outer edge of the scrubbing member, and an oscillatory link coupled to an inner edge of such member. By canting the axis joining the crank and oscillatory link to the frame and scrubbing member, an additional motion component, parallel to the direction of travel of the vehicle can be attained.

For the purpose of illustrating the invention, there are shown in the drawings forms which are presently preferred; it being understood, however, that this invention is not limited to the precise arrangements and instrumentalities shown.

FIGURE 1A is a diagrammatic representation of the paths of movement of various points on the scrubbing members as seen in FIGURE 1.

Figure 1:
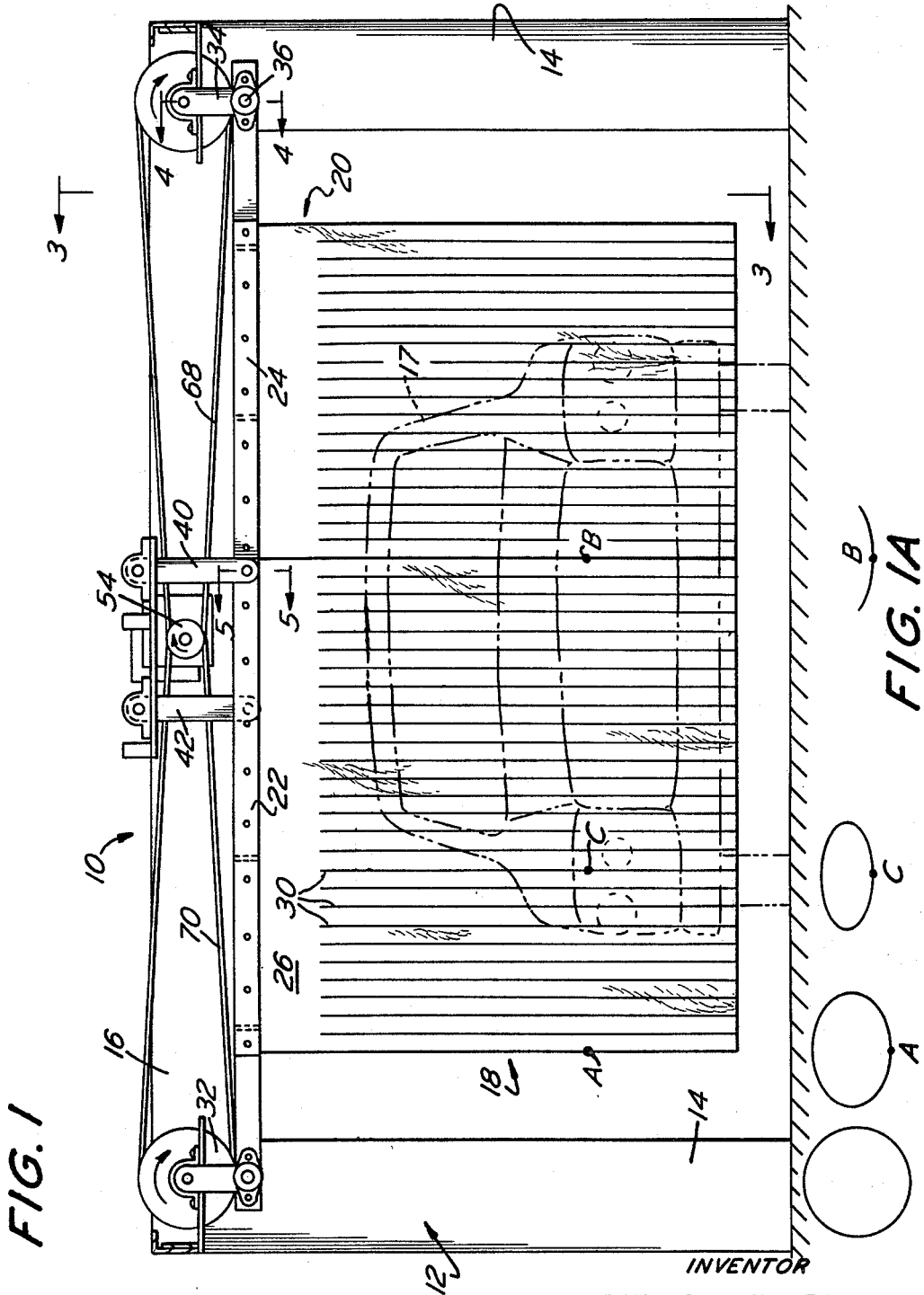
FIGURE 1 is a front elevation view of a scrubbing apparatus in accordance with the present invention.

Referring now to the drawings in detail, wherein like numerals indicate like elements, there is seen in FIGURE 1 a scrubbing apparatus designated generally by the reference numeral 10. The scrubbing apparatus 10 includes a frame designated generally by the reference numeral 12. In the illustrated form, the frame 12 includes vertically disposed legs 14, and a horizontally disposed bridge portion 16 spanning the legs 14. Thus, the legs 14 and bridge 16 define an opening. An automobile 17 is adapted to pass through such opening.

Suspended from the frame and partially closing the opening are scrubbing members designated generally by the reference numerals 18 and 20. Scrubbing members 18, 20 comprise in the illustrated embodiment open frame members 22, 24. Curtain-like elements 26, 28 are secured to the open frame members 22, 24. The curtain-like elements may take the form of carpeting or similar heavy rough-textured material. Slits 30, extending upwardly from bottom edges of the curtain-like elements 26, 28 in effect divide such elements into a series of closely spaced vertically disposed strips. Curtain-like elements 26, 28 are secured to open frame members 22, 24 by bolts, clips, or the like, not numbered. Such means of securement facilitate easy removal and replacement of the curtain-like elements 24, 26, such elements of course being subject to wear.

Figure 3:
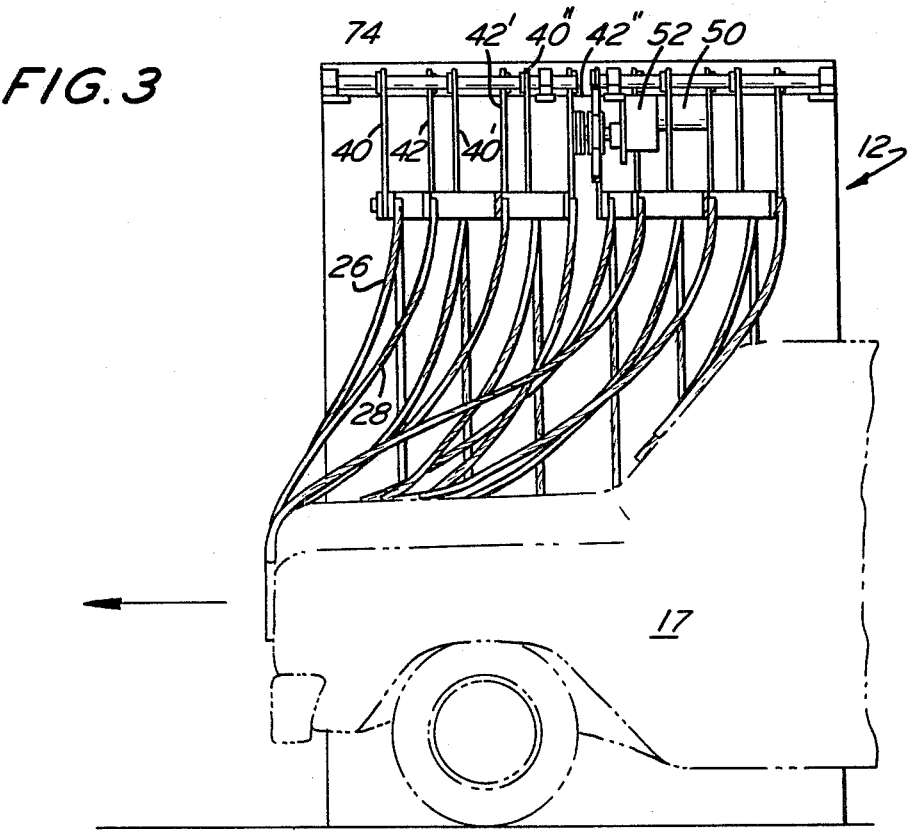
FIGURE 3 is a side elevation view, taken in cross-section along the line 3—3.

Referring to FIGURES 1 and 3, the manner in which the scrubbing members 18, 20 are supported by the frame is apparent. Crank arms 32, 34, rotatable through a full 360° arc are pivotally mounted at opposite sides of the frame 12. The respective outer end portions of the open frame members 22, 24 are pivoted to the crank arms 32, 34. Thus, referring to FIGURE 4, the crank arm 34 includes a stub shaft 36 received in a bearing portion 38 integral with open frame member 24.

Figure 5:
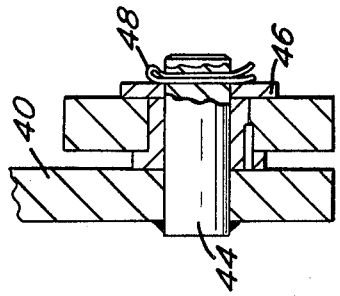
FIGURE 5 is a partial cross-sectional view taken along the line 5—5 in FIGURE 1.

Links 40, 42, pivoted at their respective upper ends to bridge members 16 of the frame 12, are pivotably coupled at their lower ends to the open frame members 22, 24, respectively. The links 40, 42 are coupled to inner ends of the frame members 22, 24, respectively. FIGURE 5 shows details of the joint between link 40 and open frame member 22. Such joint, it should be understood, is typical of the joints between the links and open frame members. The link 40 includes a stub shaft 44. A sleeve bearing 46 is keyed to a portion of the open frame member 22. Also, in the illustrated embodiment, a cotter pin 48 passes through the stub shaft 44 to maintain the parts in assembled relation. The pivot joints illustrated in FIGURES 4 and 5, it should be understood, are merely illustrative, and other equivalent constructions are feasible.

Figure 2:
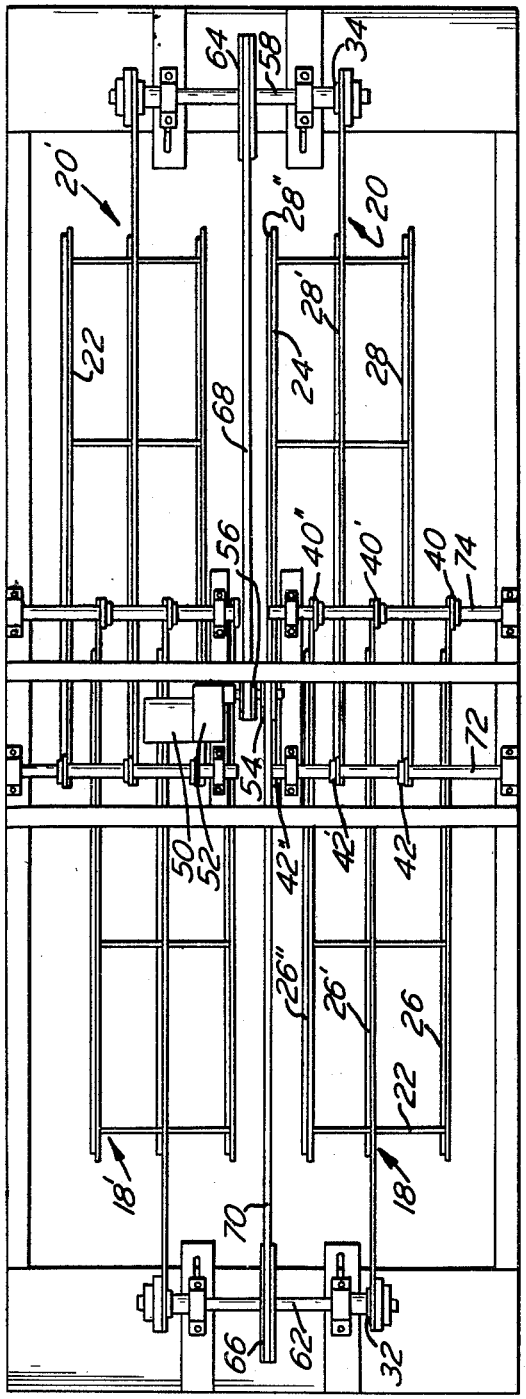
FIGURE 2 is a top plan view of the apparatus in FIGURE 1.
Figure 4:
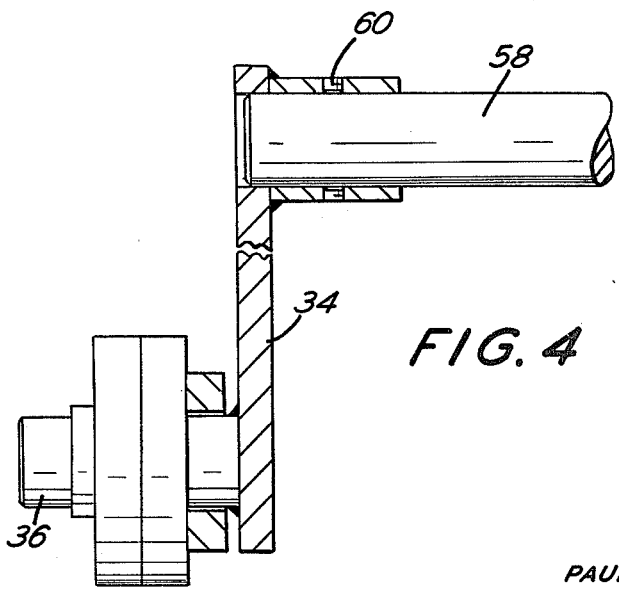
FIGURE 4 is a detail cross-sectional view taken along the line 4—4 in FIGURE 1.

Referring again to FIGURES 1 and 2, an arrangement whereby a single motor may be used to drive the scrubbing members 18 and 20 is shown. The motor 50 and a gear box 52 providing suitable reduction gearing are mounted on the frame 12. An output shaft of the gear box 52 is provided with coaxial pulleys 54, 56. Referring to FIGURE 4, crank arm 34 is secured to a shaft 58. The crank arm 34 may be secured to the shaft 58 by set screws 60 or the like. Crank arm 32 is secured to a shaft 62, similar to the shaft 58. A pulley 64 is fixed to shaft 58. A similar pulley 66 is secured to shaft 62. An endless belt 68 is provided to transmit drive from pulley 56 to pulley 64 and shaft 58. Similarly, an endless belt 70 is provided to transmit drive from the pulley 54 to pulley 66 and shaft 62. Thus, rotation of the pulleys 54 and 56 results in rotation of the shafts 62 and 58, as well as the crank arms 32 and 34. Such rotation results in a cyclic, nearly circular motion of points on scrubbing members 18 and 20 near the crank arms 34 and 36. An example of such a point is the point designated A on the lefthand edge of curtain-like element 26, seen in FIGURE 1. Points on the scrubbing members 18, 20 adjacent the links 40, 42 undergo purely oscillatory motion, through a minor circular arc defined by the motion of the links 40, 42. Thus, the point designated B has an arcuate path of motion. Medial portions of the scrubbing members 18, 20, for example, the point designated C on the curtain-like element 26 have a generally elliptical path of motion, having a vertical component greater than the vertical movement of point B, but less than that of point A.

Referring to FIGURE 1A, the paths of movement of four spaced points on the scrubbing member 18 are depicted. It should be understood that such points are representative of corresponding points on scrubbing member 20 also. The aforementioned point A, which is relatively closely to the crank arm 22, undergoes a nearly circular motion. The point B describes a shallow arc. The point C describes a figure somewhat similar to that of A, but having a smaller vertical dimension. The portion of the open frame member 22, coupled to the crank arm 32 (by a stub shaft, not numbered, similar to the stub shaft 36) describes a wholly circular path.

The foregoing description has been made with reference to the scrubbing members 18 and 20, seen in FIGURE 1. It should be understood that such members are typical, and that similar scrubbing members 18' and 20' may be supported by the frame behind those seen in FIGURE 1. It is also apparent from FIGURE 2 that the above-described links 40, 42 may in fact be a series of spaced parallel links. Thus, in FIGURE 2, links 40', 40" and 42', 42" are similar to the links 40, 42 illustrated in FIGURE 1, but are coupled to spaced locations on the frames 22 and 24. Links 40, 40', 40" and 42, 42', 42" may be coupled to rock shafts 72, 74 on the frame 12, extending in a direction generally perpendicular to the plane of the opening therein.

Preferably, each open frame member 22, 24 supports several superimposed curtain-like elements of similar or different lengths. Thus, referring again to FIGURE 2, in addition to the above-described curtain-like elements 26, 28, further curtain-like elements 26', 26" and 28', 28" are supported by the open frame members 22, 24.

Referring to FIGURES 1 and 3, the mode of operation of the scrubbing apparatus is apparent. Operation of the motor 50 to drive the endless belts 68 and 70 causes movement of scrubbing members 18 and 20. The open frame members 22, 24 have their respective inner ends in overlapping relation, thereby insuring complete scrubbing of the vehicle. In FIGURE 3, the vehicle is shown partially advanced through the opening in the frame 12. Generally vertically disposed front portions of the vehicle are scrubbed on initial contact with the curtain-like elements 26, 28, etc. As the vehicle advances through the opening in frame 12, its generally horizontally disposed central portions are scrubbed by the inner ends of the curtain-like elements 26, 28, etc., whose motion it will be recalled is primarily horizontal. At the same time, the generally vertically disposed side portions of the car are scrubbed by outer edge portions of the curtain-like elements 26, 28, etc., whose motion includes a substantial vertical component. The net effect is an optimized scrubbing action, wherein various parts of the vehicle receive local scrubbing action suited to their particular shape.

Figure 6:
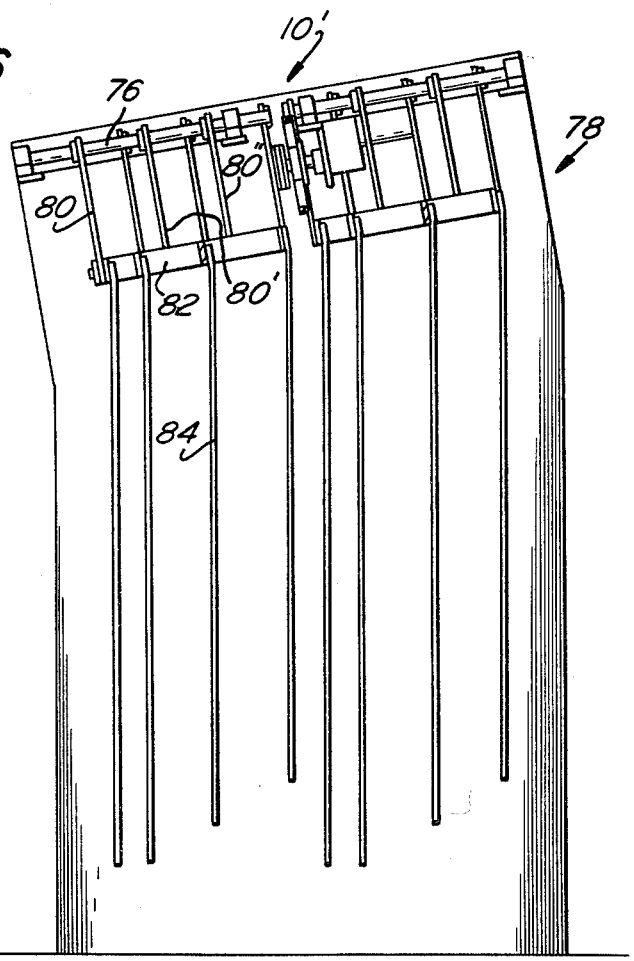
FIGURE 6 is a cross-sectional view similar to FIGURE 3, but showing an alternative form of the invention.

Referring to FIGURE 6, there is seen an alternative form 10' of the invention providing an additional desirable motion component. In the alternative form, a rock shaft 76 is mounted on a frame, designated generally by the reference numeral 78. The frame 78 is generally similar to the previously described frame 12. The rock shaft 76 is disposed, however, at an angle with respect to the horizontal. Links 80, 80', 80" corresponding to the previously described links 40, 40', 40", depend from the rock shaft 76 and normally extend downwardly at an angle toward an advancing vehicle. Thus, the pivot axis about which the links 80, 80', 80" are pivoted is disposed at an angle with respect to the horizontal. Although in the illustrated embodiment a common axis defined by the rock shaft 76 is provided, individual axes may be used with equal efficacy. Open frame members 82 and depending curtain-like elements 84 are provided and described previously. With the embodiment shown in FIGURE 6, oscillation of rock shaft 76 and links 80, 80', 80" results in a horizontal component of motion of the curtain-like elements 84 in the direction of travel of the vehicle. In a preferred embodiment, rock shaft 76 is disposed at an angle of about 30° to the horizontal.

Figure 7:
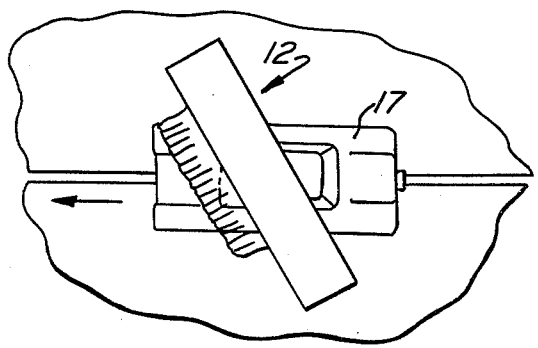
FIGURE 7 is a top plan view showing another modified form of the invention.

A component of motion in a direction toward and away from the vehicle can also be obtained by canting the frame 12 with respect to the line of travel of the vehicle. Such an arrangement is shown diagrammatically in FIGURE 7.

I claim:

1. Scrubbing apparatus for vehicles comprising a frame having an opening therein adapted to receive a vehicle, a curtain-like scrubbing member suspended from said frame across said opening for scrubbing a vehicle in said opening, means coupling said scrubbing member to said frame for movement with respect to said frame so that said member is adapted to apply a wiping and scrubbing action to a vehicle in said opening, said means coupling said scrubbing member to said frame comprising a rotating link pivotably coupled to said frame and said scrubbing member, and an oscillating link coupled to said frame and said scrubbing member and spaced from said rotating link, said rotating link providing motion of one lateral edge of said scrubbing member having a larger vertical component than the motion of the other lateral edge thereof, and motor means drivingly coupled to said rotating line.

2. Scrubbing apparatus in accordance with claim 1, wherein a pair of scrubbing members are provided, the individual scrubbing members being disposed on respective sides of said opening and having adjacent inner edges thereof.

3. Scrubbing apparatus in accordance with claim 1, said oscillating link being coupled to said scrubbing member adjacent an inner edge thereof, said rotating link being pivotably coupled to said frame and to said scrubbing member adjacent an outer edge thereof.

4. Scrubbing apparatus for vehicles, comprising a frame having an opening therein adapted to receive a vehicle, a pair of curtain-like scrubbing members suspended from said frame across said opening, the individual scrubbing members being disposed on respective sides of said opening and having adjacent inner edges thereof, means coupling said scrubbing members to said frame for movement with respect to said frame whereby said members apply a wiping and scrubbing action to a vehicle disposed in said opening, said means for coupling said scrubbing members to said frame comprising rotating links pivotably coupled to said frame and to respective scrubbing members adjacent outer edges thereof, and oscillating links coupled to said frame and to respective scrubbing members adjacent the inner edges thereof, said rotating and oscillating links providing movement of outer edges of said scrubbing members different from the movement of the inner edges of said scrubbing members, the axes about which said rotating and said oscillating links move with respect to said frame being disposed at an angle to the horizontal so that said scrubbing members have a horizontal component of motion in a direction parallel to the path of relative motion between the frame and a vehicle to be scrubbed, and motor means drivingly coupled to said rotating links.

5. Scrubbing apparatus in accordance with claim 4 wherein each of said scrubbing members is supported by a plurality of links, the links supporting respective scrubbing members being pivotable about a common axis.

6. Scrubbing apparatus in accordance with claim 5 wherein said common axis is disposed at an angle of about 30° to the horizontal.

7. Scrubbing apparatus in accordance with claim 3 wherein said rotating link and said oscillating link are coupled to said frame for rotation about axes disposed at an angle to the horizontal so that said scrubbing member has a horizontal component of motion in a direction parallel to the path of relative motion between the frame and a vehicle to be scrubbed.

8. Scrubbing apparatus in accordance with claim 7 wherein a plurality of oscillating links support said scrubbing member, the links supporting said scrubbing member being pivotable about a common axis.

9. Scrubbing apparatus in accordance with claim 8 wherein said common axis is disposed at an angle of about 30° to the horizontal.

10. Scrubbing apparatus in accordance with claim 1 wherein said frame is disposed at an oblique angle with respect to the path of relative motion between said frame and a vehicle to be scrubbed so that the movement of said scrubbing member has a horizontal component of motion in a direction parallel to such path of motion.

References Cited

UNITED STATES PATENTS

| | | | |
|---|---|---|---|
| 1,827,887 | 10/1931 | Gillespie | 15—53 X |
| 2,170,792 | 8/1939 | Brooke. | |
| 3,089,168 | 5/1963 | Blanford | 15—97 X |
| 3,345,666 | 10/1967 | Hanna et al. | 15—97 X |

FOREIGN PATENTS

| | | |
|---|---|---|
| 719,812 | 12/1954 | Great Britain. |
| 891,955 | 3/1962 | Great Britain. |

WALTER A. SCHEEL, Primary Examiner

L. G. MACHLIN, Assistant Examiner